March 21, 1933. C. A. PURDIN 1,902,376
FOOD MIXER
Filed Feb. 10, 1932
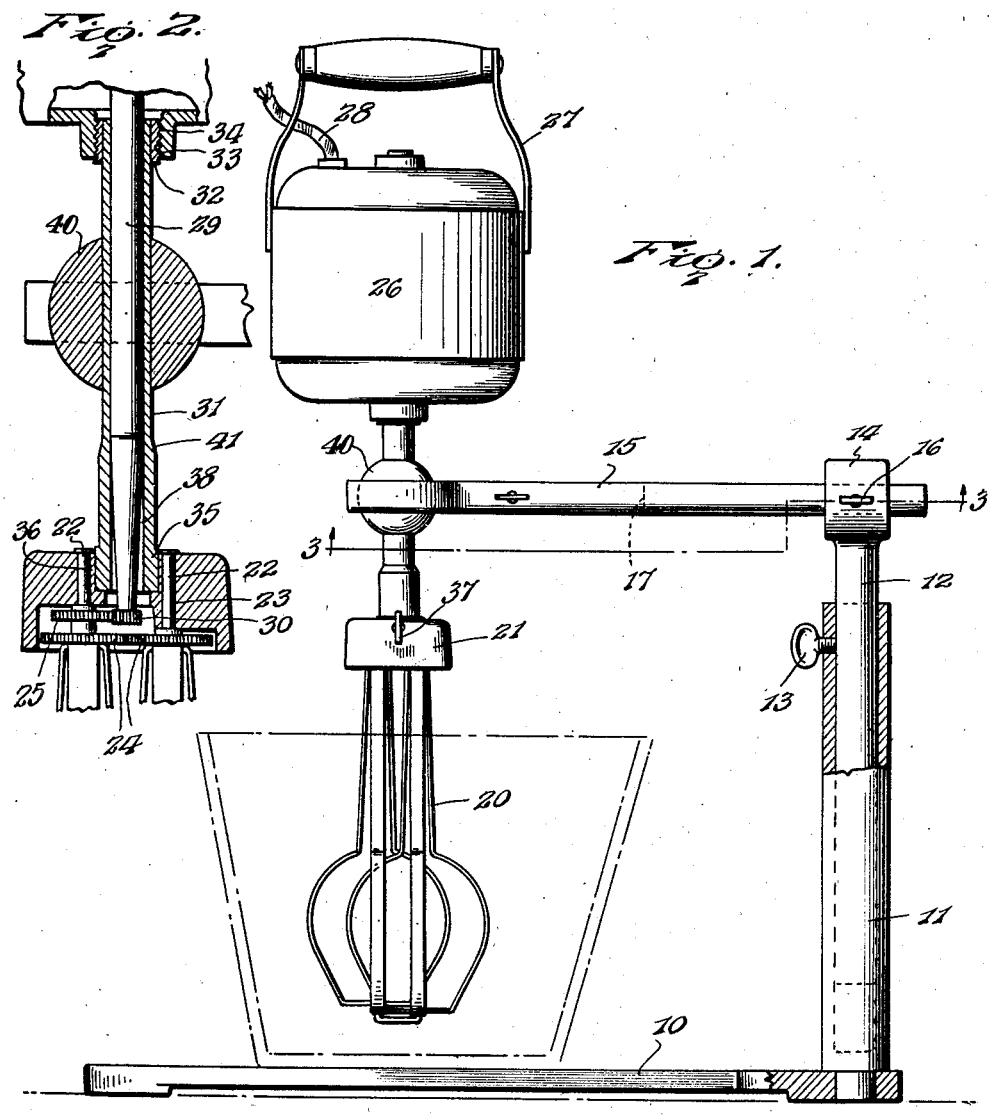

Patented Mar. 21, 1933

1,902,376

UNITED STATES PATENT OFFICE

CONN A. PURDIN, OF CHICO, CALIFORNIA

FOOD MIXER

Application filed February 10, 1932. Serial No. 592,144.

This invention relates to mixing devices and has for an object to provide a device of this character in which the beaters may be anchored at any position in the bowl and rotated at will.

A further object is to provide a mixer in which the beaters can be positioned to operate laterally of the center of the bowl at the top or bottom in any size bowl, this being accomplished by means of a ball and socket joint, in which the driving shaft housing is slidably mounted.

A further object is to provide a mixer in which the beater can be removed from its supporting stand without disconnecting the beater from the motor so that the motor and beater may be used separate from the stand.

A further object is to provide a mixer in which the beaters can be disconnected and removed from the motor for cleansing without disassembling the motor from the supporting stand.

A further object is to provide a telescopic supporting stand by means of which should the bowl be too large for the beater to reach the top within the limits of play of the universal joint, the standard may be extended to accomplish this result.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawing forming part of this specification,

Figure 1 is a side elevation of my improved mixer.

Figure 2 is an enlarged longitudinal sectional view through the universal connection between the beater and motor assembly and the supporting stand.

Figure 3 is a detail plan view showing the mounting arm for the motor and beater assembly.

Referring now to the drawing in which like characters of reference designate similar parts in the various views, the supporting stand comprises a base plate 10, from one end of which rises a telescopic standard comprising a tube 11 in which is slidably received a stem 12, the latter being secured at any desired height in the tube by means of a set screw 13 and terminating in an eye 14. An arm 15 is slidably received at one end in the eye 14 and is adjustably mounted therein by means of a set screw 16. The arm is split near the free end as shown best at 17, Figure 3, and the branches 18 are curved outwardly from each other to provide a socket. A set screw 19 is passed through the split end of the arm for tightening the socket.

The beater and motor assembly is carried on the free end of the arm 15, the beaters 20 being of the usual rotary interdigitating type common in egg beaters and the like, and being received at the upper ends in a gear case 21. As usual the shafts 22 of the beaters are mounted in suitable bearing openings 23 in the gear case and are equipped with meshing gears 24 for rotating the beaters oppositely to each other. The shaft of one of the beaters is equipped with a drive gear 25.

The motor 26 may be of any suitable type and is equipped with a handle 27 and preferably the attachment cord 28 is carried through the top of the motor at the handle so as to be out of the way and not interfere with the operation of the beaters. As best shown in Figure 2, the shaft 29 of the motor is terminally equipped with a gear 30 which meshes with the drive gear 25.

The motor shaft is carried axially in a tubular housing 31 which is provided with an external collar 32 at the upper end, the collar being exteriorly threaded as shown at 33 to be received in the screw threaded nipple 34 of the motor housing. The lower end of the housing 31 is provided with a collar 35 which is removably secured in an opening 36 in the gear case by means of a set screw 37, best shown in Figure 1. The bore of the housing is substantially cylindrical while the tip end of the motor shaft is tapered as shown at 38, the gear 30 being of the same diameter as the cylindrical bore of the housing to permit the assembly and disassembly of the beaters from the motor shaft for inspection and repairs.

A ball 40 is mounted on the motor shaft housing 31 in any suitable manner and slidably receives the housing, sliding movement of the housing through the ball being limited, as best shown in Figure 2, by means of a shoulder 41 formed on the housing below the ball and by means of the collar 32 carried on the upper end of the housing. The ball is received in the socket formed by the branches 18 on the end of the arm 15 and permit of the motor and beater assembly being swung at various angular positions from the vertical while at the same time the motor and beater assembly may be raised and lowered through the ball since the ball slidably receives the motor shaft housing as heretofore described. Tightening or loosening of the set screw 19 carried by the arm 15 correspondingly moves the branches 18 of the socket to increase or decrease friction on the ball.

It will be observed that by simply loosening the set screw 37 the gear case carrying the beaters as a unit therewith may be detached from the motor shaft housing for cleansing and inspection and repairs when necessary. It will also be observed that by loosening the set screw 19 carried by the arm 15 the motor and beater assembly may be bodily removed from the supporting stand for operation independent of the stand wherever desired.

It will also be pointed out that by adjusting the extensible standard vertically, that is by loosening the set screw 13, the stem 12 may be raised to position the beaters at sufficient height to be received in extremely high bowls, without disturbing the motor and beater assembly.

It will be further pointed out that the device is formed of a few simple and durable parts which are inexpensive to manufacture and which will not easily get out of order.

From the above description, it is thought that the construction and operation of my invention will be fully understood without further explanation.

What is claimed is:

1. A mixer comprising a vertically adjustable standard, a horizontally adjustable supporting arm thereon terminating in an adjustable socket, and a combined motor and beater assembly having a ball slidable bodily toward and away from the motor and pivotally received in said socket to contact the assembly for universal as well as vertical sliding movement on the supporting arm.

2. In a mixer, a supporting stand, a horizontal arm carried by the stand and terminating in branches curved oppositely from each other at the ends and hollowed out to provide a ball receiving socket, a set screw passed through said branches, a ball received in said socket and forming a universal joint, frictional engagement between the socket and ball being regulated by means of said set screw, a shaft housing slidably mounted axially in the ball, a motor on one end of the housing, and a beater on the other end of the housing operatively connected to the motor, sliding of the housing through the ball raising and lowering the motor and beater as a unit according to the direction in which the housing is slid.

In testimony whereof I affix my signature.

CONN A. PURDIN. [L. S.]